H. ESTES.
Cotton Bale-Ties.
No. 147,380. Patented Feb. 10, 1874.
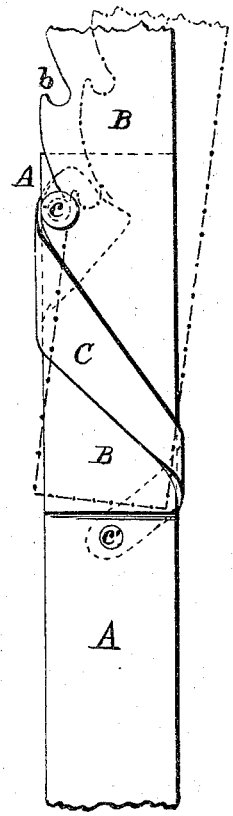
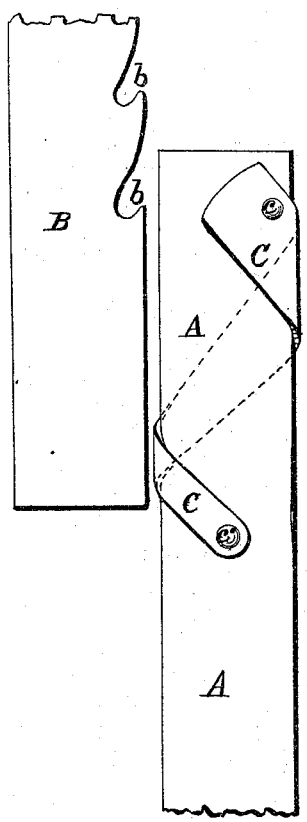
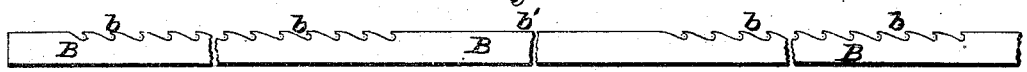
ATTEST: INVENTOR:
Robert Burns Henderson Estes
H. T. Garner By Knight Bros. Attys.

UNITED STATES PATENT OFFICE.

HENDERSON ESTES, OF ST. LOUIS, MISSOURI.

IMPROVEMENT IN COTTON-BALE TIES.

Specification forming part of Letters Patent No. 147,380, dated February 10, 1874; application filed December 1, 1873.

CASE A.

*To all whom it may concern:*

Be it known that I, HENDERSON ESTES, of St. Louis, St. Louis county, Missouri, have invented a certain Improved Bale-Tie, of which the following is a specification:

This invention consists in the provision at one end of the band of a sleeve formed of a piece of sheet metal bent obliquely around the band and riveted thereto, one of the rivets projecting to form a stud, which engages in one of a series of marginal recesses or notches in the opposite end of the band. In application the notched end of the band is passed angularly through the sleeve as far as required, and by drawing it straight one of its marginal notches engages on the rivet-stud, so as to form a lock.

In the drawings, Figure 1 is a back view, showing in full lines the tie locked, and in dotted lines showing the tie in process of locking. Fig. 2 is a front view, showing the parts detached. Fig. 3 is a detail view of the notched end of the band.

A B are the ends of the baling-band. The end A is provided with a sleeve, C, formed of sheet metal obliquely lapped around the end A, and riveted thereto by rivets $c\ c'$. The rivet $c$ projects inside the sleeve to form a locking-stud, and may be provided with a head, if desired, to assist the sleeve C in preventing the lap B from springing away from the end A.

The end B is provided with a series of marginal notches or recesses for engagement on the rivet or stud $c$ to form a lock. In the compress the bales are much reduced in size, and the same hoops being used a part of one end is thrown away, and it would be unnecessary that the marginal notches should be provided, except at the two places which would occupy the sleeve; first in the original baling on the plantation, and second at the compress, the space between these two places being left unnotched, as shown at $b'$ in Fig. 3.

The operator passes the end B angularly down through the sleeve C, and pulls it down as far as required, and then shoves it into a parallel position with the band end A, so as to engage one of its marginal notches $b$ on the stud $c$ of the end A to form a lock; and as the band's ends A B only lie in a parallel position when locked (the stud $c$ otherwise preventing) the operator can tell that a lock is effected when the two ends assume a parallel position.

I claim as my invention—

The tie formed of a sleeve, C, riveted to the band end A and stud $c$, in combination with the notched end B $b$, substantially as set forth.

HENDERSON ESTES.

Witnesses:
SAML. KNIGHT,
ROBERT BURNS.